Dec. 24, 1957    J. P. HEISS    2,817,565
PISTON RING
Filed March 6, 1956
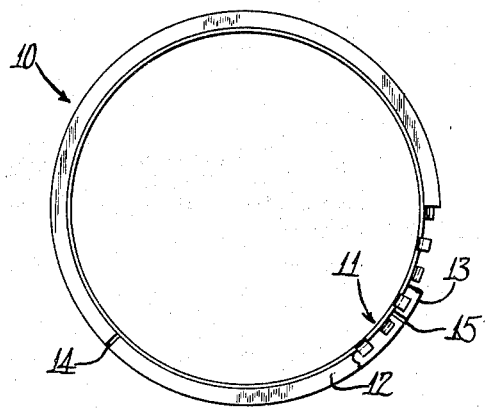
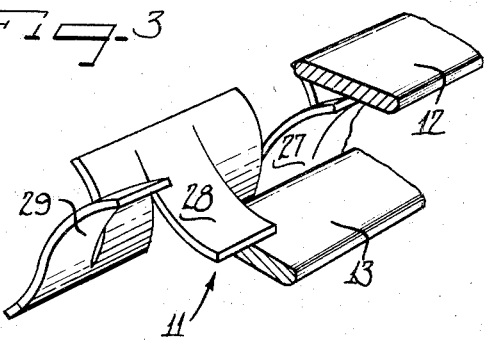
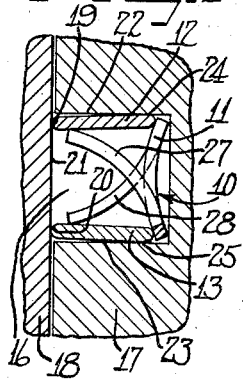
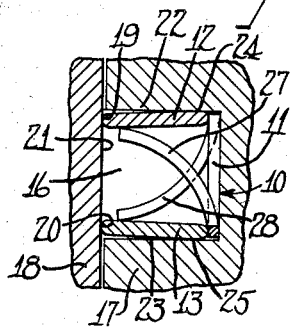
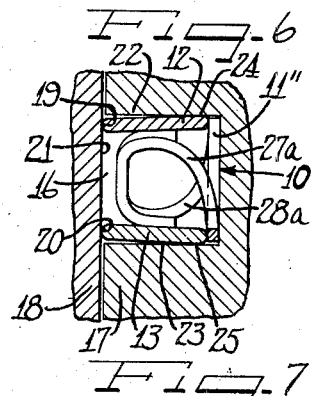
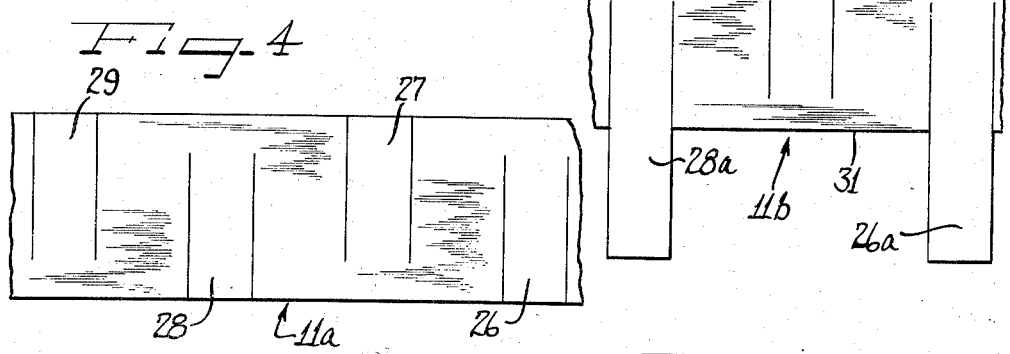
Inventor
John P. Heiss
by Hill, Sherman, Meroni, Gross & Simpson Attys

United States Patent Office 2,817,565
Patented Dec. 24, 1957

2,817,565
PISTON RING

John P. Heiss, Flint, Mich., assignor to Thompson Products, Inc., Cleveland, Ohio, a corporation of Ohio Application March 6, 1956, Serial No. 569,768

14 Claims. (Cl. 309—44)

The present invention relates to piston rings generally and more particularly relates to oil groove sealing ring assemblies for piston and cylinder assemblies to prevent oil flow and leakage therebetween.

With still greater particularity, the present invention relates to new and improved expander-spacer ring elements in an oil ring assembly wherein an expander-spacer ring seats in an oil ring groove and properly supports and spaces thin oil sealing rings to effect a proper sealing between the piston and cylinder to prevent oil flow and leakage therebetween.

Oil control sealing rings in such an exemplary installation as in the piston ring grooves of a piston reciprocably arranged in the cylinder of an internal combustion engine have had numerous forms and have been of numerous types. In recent years, however, the most common type of oil control ring has actually been an assembly wherein thin split sealing rings have been disposed in the oil ring groove with an expander and a spacer or a combination expander and spacer to hold the thin split rings at a properly spaced apart relation in the groove and to resiliently expand the same against the cylinder wall wherein the piston reciprocates in order to prevent the flow or leakage of lubricating oil into the combustion chamber.

The piston ring assembly of the instant invention is of the split ring and expander-spacer ring type and represents an important new development in this type of ring by virtue of its advantages over those ring assemblies heretofore known and its improved simplified construction resulting in great economies in time, materials and manufacturing expenses generally.

In accordance with the principles of this invention an expander-spacer ring of highly improved characteristics may be formed easily, conveniently and most economically from an elongated strip of suitable material such as one having resiliency as well as strength and oil and heat resistance, such as any suitable steel or alloy steel. The elongated strip will have simple transverse three edge tabs cut therein or formed thereon integrally therewith after which merely bending the tabs or bending the tabs and bending the remainder of the strip will form the expander-spacer ring after an appropriate length of the so-formed strip has been bent into an annular configuration. The bending of the tabs will provide supporting members for the thin split rings while the remainder of the strip will provide backing members for the thin split rings so that the entire ring is operable as an expander-spacer ring.

It is, therefore, an important feature and object of the present invention to provide a new and improved oil ring assembly.

Still another object of the present invention is to provide a new and improved expander-spacer ring for an oil ring assembly.

Still another important object and feature of the present invention is to provide a new and improved expander-spacer ring for an oil ring assembly wherein the expander-spacer ring is formed in an elongated strip of resilient material having transverse tabs or fingers thereon to support and properly space the thin oil rings of the oil ring assembly while the remainder of the strip is effective for backing and expanding the thin oil rings.

Still another object, feature and advantage of the present invention is to provide a new and improved expander-spacer ring formed from a strip of uniform width and having three sided tabs or fingers cut therein and bent away from the remainder of the strip.

Still another object of the present invention is to provide a new and improved expander-spacer ring formed from a strip of suitable material and having three-sided tabs cut therein transversely thereof and other lengths greater than the width of the remainder of the strip and bent to form thin oil rings supporting the fingers.

Still another object of the present invention is to provide a new and improved expander-spacer ring operative to properly space and expand thin oil rings and to properly maintain the same dished and to engage the thin oil rings at an angle thereto to dish the rings for proper and effective sealing between the piston and the cylinder.

Still other objects, features and advantages of the present invention will become readily apparent from the following detailed description of the invention and embodiments thereof, from the claims, and from the accompanying drawings in which each and every detail is fully and completely shown as a part of this specification, and in which like reference numerals refer to like parts, and in which:

Figure 1 is a plan view of an oil ring assembly embodying the principles of the present invention and with parts thereof broken away to better illustrate other parts thereof;

Figure 2 is a sectional view of an oil ring assembly as shown in Figure 1 and further shown in an oil ring groove in a piston associated with a cylinder;

Figure 3 is a perspective view of the oil ring assembly of Figures 1 and 2;

Figure 4 is a fragmental plan view of a blank for forming the expander-spacer ring of the oil ring assembly of Figures 1, 2 and 3 and is also a blank for forming the expander-spacer ring of the oil ring assembly of Figure 5;

Figure 5 is an illustration like Figure 2 showing another form of expander-spacer ring in accordance with this invention;

Figure 6 is an illustration like Figures 2 and 5 showing still another form of expander-spacer ring embodying the principles of this invention; and Figure 7 is a fragmental plan view of a blank for forming the expander-spacer ring of the oil ring assembly of Figure 6.

As is clearly illustrated in the drawing the piston ring assembly of the present invention is an oil sealing ring assembly of the type wherein a pair of thin split sealing rings are expanded and maintained spaced apart by an expander-spacer ring when the parts of the assembly are properly placed together and fitted into the oil ring groove piston so that the thin split rings will bear against the cylinder wall.

In Figure 1 the assembly is shown remote from any piston in a cylinder and indicated generally at 10. Therein it is also shown that an expander-spacer ring 11, when in assembly, is disposed between a pair of thin rail or thin split rail rings 12 and 13 which are split or opened for expansion and contraction as indicated at 14 and 15 respectively.

The expander-spacer ring has parts thereof disposed between the two rails 12 and 13 with parts thereof abutting the inner peripheries of the rails so that the resiliency of the expander-spacer ring will resiliently space the two rails and further will resiliently expand the rails.

The rails 12 and 13 are usually commercially formed by coiling a strip of suitable material edgewise thereof into a closely wound coil and then cutting the coil longitudinally thereof to separate the individual convolutions which in turn form the individual rail or split thin rings. When so formed the rails have a natural tendency to "dish" by virtue of the contraction of the inner peripheries thereof and the expansion of the outer peripheries thereof during the coiling operation.

This dishing has been found to be highly advantageous and desirous for oil sealing by control rails of a thin ring assembly inasmuch as utilization of the dishing properties of the rings provides an improved sealing effect between the thin rings and the sides of the oil ring grooves in the piston and aids in more effective sealing between the outer peripheries of the rings and the cylinder walls.

Proper utilization of this dishing effect is enhanced and aided by causing the expander-spacer ring to have an appropriate configuration to so expand the thin rings and so space the same and as to exert both radial and axial forces thereagainst. Expander-spacer rings such as the ring 11 incorporating the principles of this invention perform that function.

Thus, as shown in Figure 2 the rails 12 and 13 are so supported and expanded by the expander-spacer ring 11 of the oil control ring assembly 10 within an oil ring groove 16 in a fragmentally shown piston 17 reciprocable and cooperatively arranged in the fragmentally illustrated cylinder 18 that the rails 12 and 13 are biased radially outwardly to have their outer peripheral edges 19 and 20 respectively sealingly engaging the wall 21 of the cylinder 18. The rails 12 and 13 are further so biased by the expander-spacer ring 11 that they are relatively inclined with respect to the side wall faces 22 and 23 of the groove 16 that they engage the faces 22 and 23 only in the region of the inner peripheral portions of the outer faces of the rings as indicated generally at 24 and 25 respectively.

The expander-spacer ring 11, operable to be effective as described above and constructed in accordance with the principles of this invention, may be easily, conveniently and economically constructed. This expander-spacer ring 11 may be constructed from a strip of suitable resilient, strong, oil and heat resistant material such as steel or an alloy steel, a length of which is shown in Figure 4. In Figure 4 the strip blank, indicated generally as 11a, is an elongated strip of uniform width. At regularly spaced intervals along the strip 11a the strip is cut with cuts defining three-sided tabs or fingers of which four are shown as 26, 27, 28 and 29. The cuts defining these fingers do not extend entirely across the width of the strip but, instead, extend from one edge thereof to a distance near the other edge thereof with all cuts being substantially the same length. Further, the cuts are provided in pairs to define the three-sided fingers or tabs with the pairs being cut inwardly from alternately opposite sides of the strip 11a so that the fingers or tabs are alternately in the same direction and so that adjacent fingers or tabs extend in opposite lateral directions. That is, among the four tabs shown in Figure 4, tabs 26 and 28 extend towards one edge of the strip 11a while tabs 27 and 29 extend towards the other edge of the strip so that the adjacent tabs extend in opposite lateral directions and alternate tabs extend in the same lateral direction.

To form the expander-spacer ring 11 of Figures 2 and 3 from the strip of Figure 4, the strip is bent to be transversely arcuate with a relatively long radius of curvature compared to the arc length of the strip or the transverse dimension thereof. Also, the fingers or tabs are bent arcuately away from the remainder of the strip, the radius of curvature thereof also being relatively large compared to the arc length or dimension of the fingers or tabs. Further, the tabs are so bent that the chords defined thereby and by the remainder of the strip define an acute angle whereby, as a matter of explanation and a means of description, the fingers or tabs are relatively diagonal of an imaginary enclosing rectangle about a section of the expander-spacer ring. (For instance, for the purpose of visualizing the immediately preceding statement, attention is invited to Figure 2.)

Then, an appropriate length of the strip is cut off and rolled into a cylindrical ring configuration to complete the formation of the expander-spacer ring 11. When so formed, the ring will have fingers operable to resiliently space the rail rings 12 and 13 while the transverse edge regions of the remainder of the strip will be operable to engage the inner peripheral edge of each of the rail rings to resiliently expand the same and maintain the outer peripheral edges thereof at the proper sealing engagement with the cylinder wall.

Additionally, by arcuately configurating the remainder of the ring, other than the fingers, dishing of the rail rings as described above will be emphasized since the rail rings and the abutment portions of the expander-spacer ring will engage each other at an angle whereby the expander-spacer ring will exert both radial and axial forces against the inner edges of the rail rings.

This effect and the operability of the ring is also present when the portions of the strip other than the fingers or tabs is not arcuately bent so that the expander-spacer ring has a straight cylindrical ultimate configuration with the fingers extending outwardly therefrom as viewed in Figure 5 wherein the expander-spacer ring is identified as 11'. Other than not transversely arcuately forming the remainder of the expander-spacer ring, the embodiment of Figure 5 is identical to the embodiment of Figure 2.

Another form of an expander-spacer ring embodying the principles of this invention is shown in Figure 6 while the strip blank for forming the same is shown in Figure 7. In Figure 7 a fragmental length of the strip blank is shown at 11b and it is illustrated that the fingers or tabs 26a, 27a, and 28a extend transversely beyond the edges 30 and 31 of the strip so that the fingers or tabs are about twice as long as the fingers or tabs 26, 27 and 28 etc. respectively, measuring the same from the outermost edge thereof to the terminus of the cuts extending into the strip to form the three sided fingers or tabs.

These tabs or fingers are then bent or rolled back upon themselves in such a manner that the innermost portions thereof are formed very much the same as the fingers 27 and 28 etc. but of a slightly smaller radius of curvature so that they do not extend as far across the strip as do the fingers 27 and 28 when bent outwardly. The ends of the fingers 26a, 27a and 28a are bent around still further, however, so as to form a nearly complete loop and so that the terminal ends thereof properly engage the rings 12 and 13 to properly space the same while the angle of engagement therewith is proper to promote dishing of the rails 12 and 13.

The remainder of the expander-spacer ring 11" may be arcuately formed or straight formed as in Figures 2 and 5 and is shown in Figure 6 as straight cylindrically formed. In either event the ring will promote proper dishing of the rails 12 and 13 and will be operative to effect proper sealing. Other than having the longer and more complexly bent fingers thereon, the ring 11" is identical to the rings 11' and 11.

From the foregoing it will be seen that numerous modifications and variations may be effected within the scope of this invention without departing from the true spirit and novel concepts thereof. I, therefore, intend to cover all such modifications and variations as fall within the true spirit and scope of the novel concepts and principles of the invention.

I claim as my invention:

1. A sealing ring assembly for an oil ring groove to seal a piston and cylinder against oil flow and leakage therebetween comprising, a pair of thin sealing rings, and an expander-spacer ring, said ring comprising a strip of suitable material disposed as a split expansible member of generally cylindrical form and having a plurality of tabs each defined by a pair of transversely directed cuts extending from one edge of said strip, each of said tabs extending arcuately from the remainder of the strip, the ends of said tabs resiliently engaging said sealing rings to support the same in properly spaced relation to each other in the oil ring groove.

2. A sealing ring assembly for an oil ring groove in a piston and cylinder assembly to seal the same against oil flow and leakage between the cylinder and the piston comprising, an expander-spacer ring, and a pair of thin sealing rings, said expander-spacer ring being formed from an elongated strip of resilient oil and heat resistant material, said strip having a plurality of lateral tabs each defined by a pair of transversely directed cuts extending from one edge of said strip, each of said tabs extending arcuately generally normally of said strip to support and space the rings at the ends of the tabs, the remainder of the strip being operative to engage inner peripheral edges of the rings and expand the same.

3. A sealing ring assembly for an oil ring groove in a piston and cylinder assembly to seal the same against oil flow and leakage between the cylinder and the piston comprising, an expander-spacer ring, and a pair of thin sealing rings, said expander-spacer ring being formed from an elongated strip of resilient oil and heat resistant material, said strip having a plurality of lateral tabs each defined by a pair of transversely directed cuts extending from one edge of said strip, each of said tabs extending arcuately generally normally of said strip to support and space the rings, the remainder of the strip being operative to engage inner peripheral edges of the rings and expand the same.

4. A sealing ring assembly for an oil ring groove to seal a piston and cylinder against oil flow therebetween comprising a pair of thin sealing rings and an expander-spacer ring, said expander-spacer ring being formed from a strip of suitable material and having a plurality of transverse tabs each defined by a pair of transversely directed cuts extending from one edge of said strip, each of said tabs extending arcuately away from the remainder of the strip substantially diagonally of an enclosing rectangle to resiliently engage the sealing rings and support the same in properly spaced relation the remainder of the strip being operative to engage inner peripheral edges of the rings and expand the same.

5. A sealing ring assembly for an oil ring groove to seal a piston and cylinder against oil flow therebetween comprising a pair of thin sealing rings and an expander-spacer ring, said expander-spacer ring being formed from a strip of suitable material and having a plurality of transverse tabs each defined by a pair of transversely directed cuts extending from one edge of said strip, each of said tabs extending arcuately away from the remainder of the strip substantially diagonally of an enclosing rectangle and with the end edges of the tabs directed in a direction substantially normal to the remainder of the strip, whereby the ends of the tabs are positioned to resiliently engage the sealing rings and support the same in properly spaced relation, the remainder of the strip being operative to engage inner peripheral edges of the ring and expand the same.

6. A sealing ring assembly for an oil ring groove to seal a piston and cylinder against oil flow therebetween comprising a pair of thin sealing rings and an expander-spacer ring, said expander-spacer ring being formed from a strip of suitable material and having a plurality of transverse tabs each defined by a pair of transversely directed cuts extending from one edge of said strip, each of said tabs extending away from the remainder of the strip at an angle thereto with the maximum lateral dimension between the outer faces of said tabs being less than the minimum lateral dimension between the edges of the remainder of the strip, said tabs being so arranged as to be operable to resiliently engage said sealing rings to support the same in properly spaced relation to each other and to faces of the oil ring groove, the remainder of the strips being operative to engage inner peripheral edges of the rings and expand the same.

7. A sealing ring assembly for an oil ring groove in a piston and cylinder assembly to seal the same against oil flow and leakage between the cylinder and the piston comprising an expander-spacer ring and a pair of thin sealing rings, said expander-spacer ring being formed from an elongated strip of resilient oil and heat resistant material, said strip having a plurality of integral lateral fingers each defined by a pair of transversely directed cuts extending from one edge of said strip, each of said fingers extending at an angle to the remainder of the strip transversely thereof and away therefrom, and presenting a pair of sealing ring supporting and spacing surfaces spaced apart a distance less than the lateral dimension of the strip, the lateral edges of the remainder of the strip being operative as abutment members for a peripheral edge of each of said thin sealing rings for expansion thereof.

8. A sealing ring assembly for an oil ring groove in a piston and cylinder assembly to seal the same against oil flow and leakage between the cylinder and the piston comprising an expander-spacer ring and a pair of thin sealing rings, said expander-spacer ring being formed from an elongated strip of resilient oil and heat resistant material, said strip having a plurality of integral lateral fingers each defined by a pair of transversely directed cuts extending from one edge of said strip, each of said fingers extending at an angle to the remainder of the strip transversely thereof and away therefrom, and presenting a pair of sealing ring supporting and spacing surfaces spaced apart a distance less than the lateral dimension of the strip, said fingers having a length greater than the width of the remainder of the strip, the remainder of the strip being operative to engage inner peripheral edges of the rings and expand the same.

9. A sealing ring assembly for an oil ring groove in a piston and cylinder assembly to seal the same against oil flow and leakage between the cylinder and the piston comprising an expander-spacer ring and a pair of thin sealing rings, said expander-spacer ring being formed from an elongated strip of resilient oil and heat resistant material, said strip having a plurality of integral lateral fingers each defined by a pair of transversely directed cuts extending from one edge of said strip, each of said fingers extending at an angle to the remainder of the strip transversely thereof and away therefrom, and presenting a pair of sealing ring supporting and spacing surfaces spaced apart a distance less than the lateral dimension of the strip, said fingers having a length less than the width of the remainder of the strip, the remainder of the strip being operative to engage inner peripheral edges of the rings and expand the same.

10. A sealing ring assembly for an oil ring groove in a piston and cylinder assembly to seal the same against oil flow and leakage between the cylinder and the piston comprising an expander-spacer ring and a pair of thin sealing rings, said expander-spacer ring being formed from an elongated strip of resilient oil and heat resistant material, said strip having a plurality of integral lateral fingers each defined by a pair of transversely directed cuts extending from one edge of said strip, each of said fingers extending at an angle to the remainder of the strip transversely thereof and away therefrom, and presenting a pair of sealing ring supporting and spacing surfaces spaced apart a distance less than the lateral dimension of the strip, said fingers having a length less than the width of the remainder of the strip but of such length that the end edges thereof would be aligned with the lateral edges of the remainder of the strip if the fingers were coplanar therewith, the remainder of the strip being operative to engage inner peripheral edges of the rings and expand the same.

11. A sealing ring assembly for an oil ring groove in a piston and cylinder assembly to seal the same against oil flow and leakage between the cylinder and the piston comprising an expander-spacer ring and a pair of thin sealing rings, said expander-spacer ring being formed from an elongated strip of resilient oil and heat resistant material, said strip having a plurality of integral lateral fingers each defined by a pair of transversely directed cuts extending from one edge of said strip, each of said fingers extending at an angle to the remainder of the strip transversely thereof and away therefrom, and presenting a pair of sealing ring supporting and spacing surfaces spaced apart a distance less than the lateral dimension of the strip, said fingers having a length less than the width of the remainder of the strip, the remainder of the strip being bent to engage the rings at an angle thereto, the remainder of the strip being operative to engage inner peripheral edges of the rings and expand the same.

12. A sealing ring assembly for an oil ring groove in a piston and cylinder assembly to seal the same against oil flow and leakage between the cylinder and the piston comprising an expander-spacer ring and a pair of thin sealing rings, said expander-spacer ring being formed from an elongated strip of resilient oil and heat resistant material, said strip having a plurality of integral lateral fingers each defined by a pair of transversely directed cuts extending from one edge of said strip, each of said fingers extending at an angle to the remainder of the strip transversely thereof and away therefrom, and presenting a pair of sealing ring supporting and spacing surfaces spaced apart a distance less than the lateral dimension of the strip, said fingers having a length less than the width of the remainder of the strip but of such length that the end edges thereof would be aligned with the lateral edges of the remainder of the strip if the fingers were coplanar therewith, the remainder of the strip being bent to engage the rings at an angle thereto, the remainder of the strip being operative to engage inner peripheral edges of the rings and expand the same.

13. A sealing ring assembly for an oil ring groove in a piston and cylinder assembly to seal the same against oil flow and leakage between the cylinder and the piston comprising an expander-spacer ring and a pair of thin sealing rings, said expander-spacer ring being formed from an elongated strip of resilient oil and heat resistant material, said strip having a plurality of integral lateral fingers each defined by a pair of transversely directed cuts extending from one edge of said strip, each of said fingers extending at an angle to the remainder of the strip transversely thereof and away therefrom, and presenting a pair of sealing ring supporting and spacing surfaces spaced apart a distance less than the lateral dimension of the strip, said fingers having a length less than the width of the remainder of the strip, the remainder of the strip having a straight cylindrical configuration, the remainder of the strip being operative to engage inner peripheral edges of the rings and expand the same.

14. A sealing ring assembly for an oil ring groove in a piston and cylinder assembly to seal the same against oil flow and leakage between the cylinder and the piston comprising an expander-spacer ring and a pair of thin sealing rings, said expander-spacer ring being formed from an elongated strip of resilient oil and heat resistant material, said strip having a plurality of integral lateral fingers each defined by a pair of transversely directed cuts extending from one edge of said strip, each of said fingers extending at an angle to the remainder of the strip transversely thereof and away therefrom, and presenting a pair of sealing ring supporting and spacing surfaces spaced apart a distance less than the lateral dimension of the strip, said fingers having a length less than the width of the remainder of the strip but of such length that the end edges thereof would be aligned with the lateral edges of the remainder of the strip if the fingers were coplanar therewith, the remainder of the strip having a straight cylindrical configuration, the remainder of the strip being operative to engage inner peripheral edges of the rings and expand the same.

References Cited in the file of this patent

UNITED STATES PATENTS

| | | |
|---|---|---|
| 2,594,987 | Phillips | Apr. 29, 1952 |
| 2,650,144 | Phillips | Aug. 25, 1953 |
| 2,676,076 | Hamm | Apr. 20, 1954 |
| 2,680,045 | Hamm | June 1, 1954 |
| 2,768,039 | Cable | Oct. 23, 1956 |